Aug. 2, 1932.   R. HOROWITZ   1,869,965
LIGHT CONTROL MECHANISM FOR PROJECTORS
Filed July 18, 1931   2 Sheets-Sheet 1

INVENTOR
Robert Horowitz.
BY
*Percy Freeman*
ATTORNEY

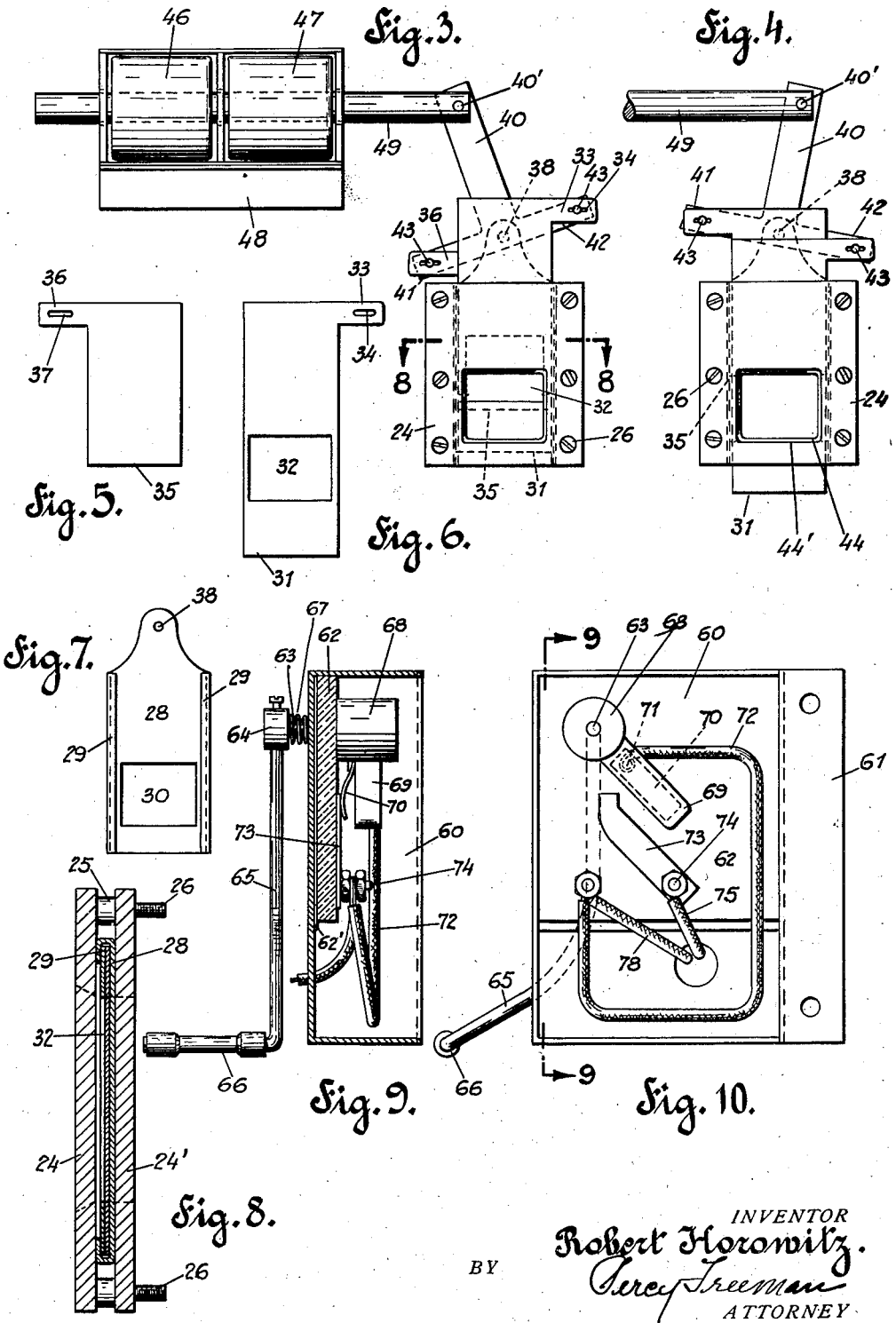

Patented Aug. 2, 1932

1,869,965

UNITED STATES PATENT OFFICE

ROBERT HOROWITZ, OF BRONX, NEW YORK

LIGHT CONTROL MECHANISM FOR PROJECTORS

Application filed July 18, 1931. Serial No. 551,698.

This invention relates to motion picture projection apparatus in which a continuous series of pictures, imprinted upon a film of the usual type, are exhibited.

One of the objects of the invention is to provide means applicable to various types of projection machines whereby a change-over from one projection machine to another may be readily effected.

A further feature is in the provision of means for interrupting the electrical current employed in controlling the light delivered to the machine, coincidently upon breaking or like failure of the film.

Another purpose is to produce an extremely rapid light shutter or dowser arranged contiguous to the film at a point where the light rays are concentrated.

A still further object is to provide electrically controlled means automatically actuated upon breakage of the film, and also by the means usually employed, the device including two solenoids arranged in tandem and having an armature or core bar common to both.

These several important objects and others of a similar nature are accomplished by the novel and simple construction and arrangement of parts hereinafter described and shown in the accompanying drawings, constituting a material part of this disclosure, and in which:

Fig. 3 is an enlarged plan view of the light dowser means shown in a closed position.

Fig. 4 is a similar but fragmentary view of the same showing the parts in an open or operative position.

Fig. 5 is a plan view of one of the light dowser elements.

Fig. 6 is a similar plan view of the mating dowser element.

Fig. 7 is a plan view of the dowser plate guide.

Fig. 8 is a transverse sectional view taken on line 8—8 of Fig. 3, drawn to an enlarged scale.

Fig. 9 is a sectional view taken on line 9—9 of Fig. 10.

Fig. 10 is a front view of the automatic safety dowser element.

Figure 1:
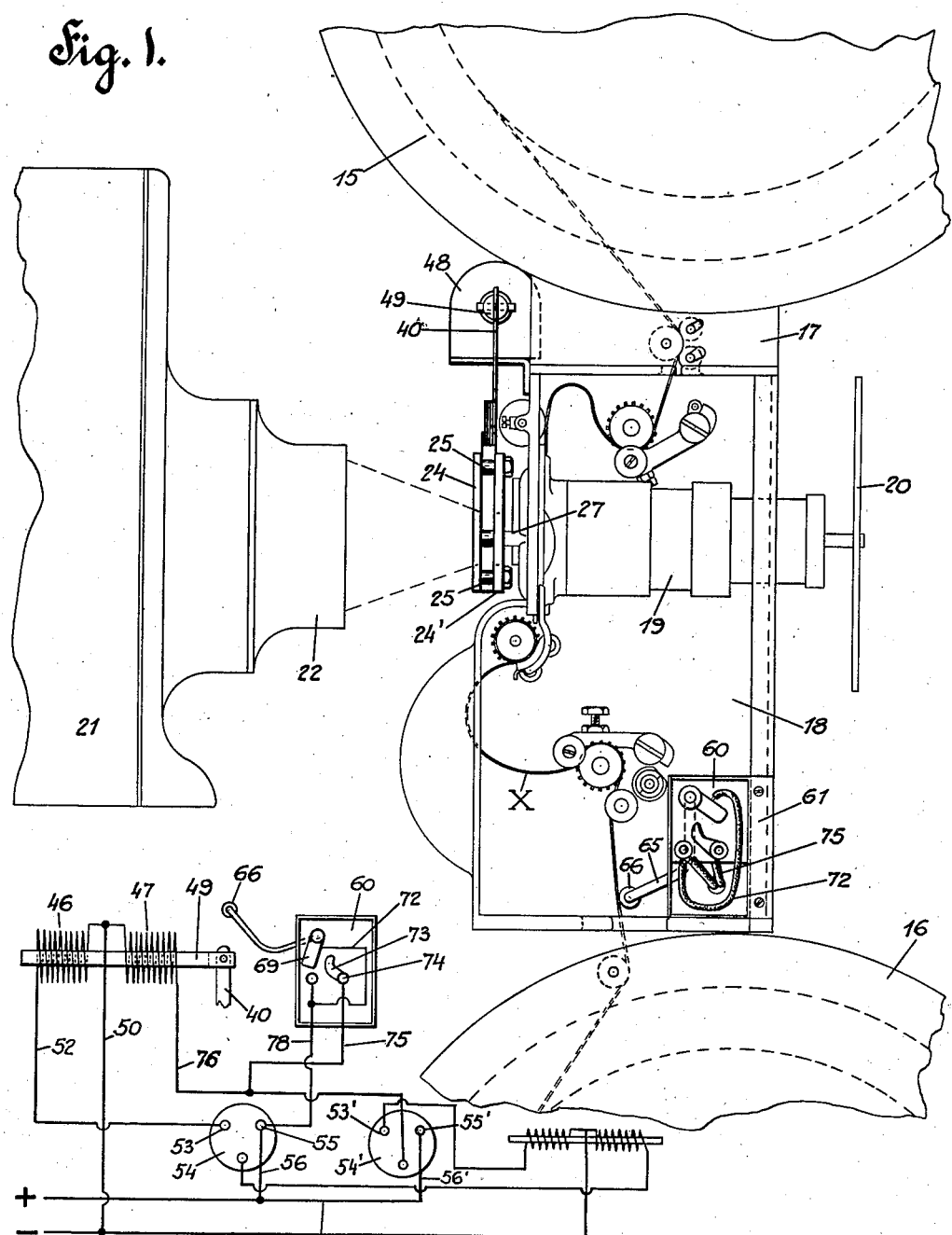
Fig. 1 is a top plan view illustrating an application of the invention to a common form of picture projection apparatus.

Referring in greater detail to the drawings, one of the film reels is generally designated by the numeral 15, while 16 is applied to the mating reel; disposed intermediate these reels is a projector mechanism 17, the same including a plate 18 on which is mounted a film actuating mechanism, including drive sprockets, tension and guide rolls, projector tube 19 and shutter disc 20.

Alined with the axis of the projector tube 19, is a light housing 21 containing lens in its throat 22 by which the light rays are concentrated conically and delivered so that the apex of the beam is substantially in the plane of the film X.

Hitherto it has been usual to provide a dowser within, or closely adjacent, the throat 22 of the lamp house at some considerable distance from the film, and it is a feature of the present invention to locate the dowser at a point closely adjacent the film, as can best be seen in Fig. 1, by which improved results are attained, such as speed in cutting off light from the film and house the screen when desired or required.

This dowser is composed of a pair of plates 24—24' having registering apertures and held apart in parallel by spacers 25 and bolts 26 in pairs at their edges and provided with nuts except for those at the center which are set in extending lugs 27 of the projecting apparatus and by which the plates 24—24' are securely attached to the apparatus.

Carried between the plates 24—24' is a thin guide plate 28 having inturned longitudinal edges 29 and containing in its lower portion a retangular aperture 30. Slidable against the forward side of the plate 28 is a dowser plate 31 containing an opening 32 dimensioned in conformity with the aperture 30 and having at its upper edge portion an outstanding arm 33 provided with a transverse slot 34.

A mating plate 35 is formed with an oppositely extending arm 36 and slot 37 at its upper portion, this plate being held in close proximity to the plate 31 by reason of the inturned edges 29 of the guide 28.

Pivoted at 38 to the central upper part of the plate 28 is an inverted T shaped lever 40 having alined arms respectively 41—42 in which are set headed studs 43 adapted to slidably engage within the slots 34 and 37 of the slidable plates.

From the foregoing it will be understood that when the lever 40 is tilted upon the pivot 38, the arms 41—42 will be rocked in such manner as to convey opposite rectilinear movement to the plates 31 and 35, thereby operating to fully open or to completely close the passage of light through the openings 44—44' in the respective plates 24—24'. Rocking of the lever 40 is accomplished by a pair of solenoids 46—47 arranged in a casing 48 secured to the support plate 18 of the mechanism, these solenoids being provided with a single unitary armature or corebar 49 pivotally connected at one end to the third arm of the lever 40.

It will be understood that these solenoids consist of coils, their inner adjacent ends being engaged by a conductor 50 leading from the negative line wire 51; the opposite, outer end of the coil 46 has a connection 52 leading to a contact 53 set in a floor switch 54, or its equivalent, and another contact 55 set to the switch, is connected by conductor 56 with the positive line wire 57 of the main conductors.

Thus if for any reason it is desired to stop the operation of the projector, the switch 54 may be utilized bringing the contacts 53—55 into circuit, thereby energizing the solenoid 46 and instantly closing the dowser, cutting off the light rays from the lantern 21—22.

Figure 2:
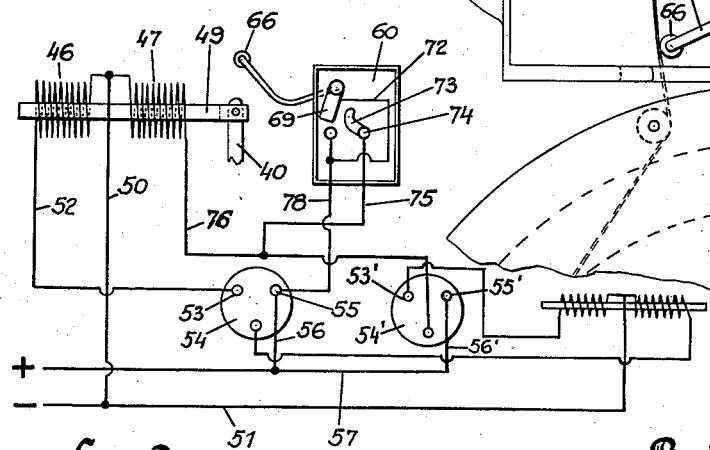
Fig. 2 is a schematic view of the same showing the circuits diagrammatically.

Referring now more particularly to Figs. 1 and 2, a safety device will be observed whereby, should the film break, solenoid 46 will be automatically energized to close the dowser to cut off light from the lamp house.

This device consists of a casing 60 having a flange 61 by which it may be secured to any convenient part of the projector mechanism; the casing contains an insulation block 62 through which extends a spindle 63 having fixed on its outer end the hub 64 of a lever 65, the free end of which is turned at a right angle and has revolubly mounted on it a roll 66 adapted to rest upon the rear surface of the film X.

The roll is held tautly against the film by the action of a torsion spring 67 encircling the spindle 63 and having one of its ends set in the lever hub 64 and the other end fixed in a part of the casing through which the spindle extends.

Mounted on the inner end of the spindle 63 is a dialectric block 68 having an arm 69 extending within the casing and carrying on its under side a spring contact 70 grounded at 71 to a conductor 72. As seen in Figs. 9 and 10, a flat strip contact 73 is held against the inner side of the dielectric block 62 by a bolt 74 in position to be contacted by the spring arm 70 when the torsional spring 67 operates to turn the lever 65 and arm 69.

Connected to the bolt 74 is a conductor 75, the same being a branch of line wire 76 connecting with the solenoid 47 and it will be understood that when a film breaks, contact will be made and a circuit formed thereby to energize the solenoid 49 which is instantly responsive.

Obviously duplicate devices may be applied in a similar manner to other machines constituting the battery installed for operation.

While the foregoing is descriptive of the best known embodiment of the invention, it will be understood that many minor modifications and changes may be made without departing from the general scope and tenor of the appended claim.

Having thus described the invention, what is claimed as new and desired to secure by Letters Patent is:—

The combination with a projection machine, of a shutter adjacent the projection aperture, a plain and an apertured plate movable in opposite directions to open and close the passage of light, a lever having opposed arms each connecting with one of said plates, a pair of solenoids arranged in tandem and having a common armature connected with a third arm on said lever, a manually operable switch controlling current to one of said solenoids, a spring impelled lever having a roll pressed against a film in said machine, and means, including a switch operated by said lever, to control the other of said solenoids.

Signed at New York, in the county and State of New York, this 13th day of July, 1931.

ROBERT HOROWITZ.